United States Patent Office 3,104,713
Patented Sept. 24, 1963

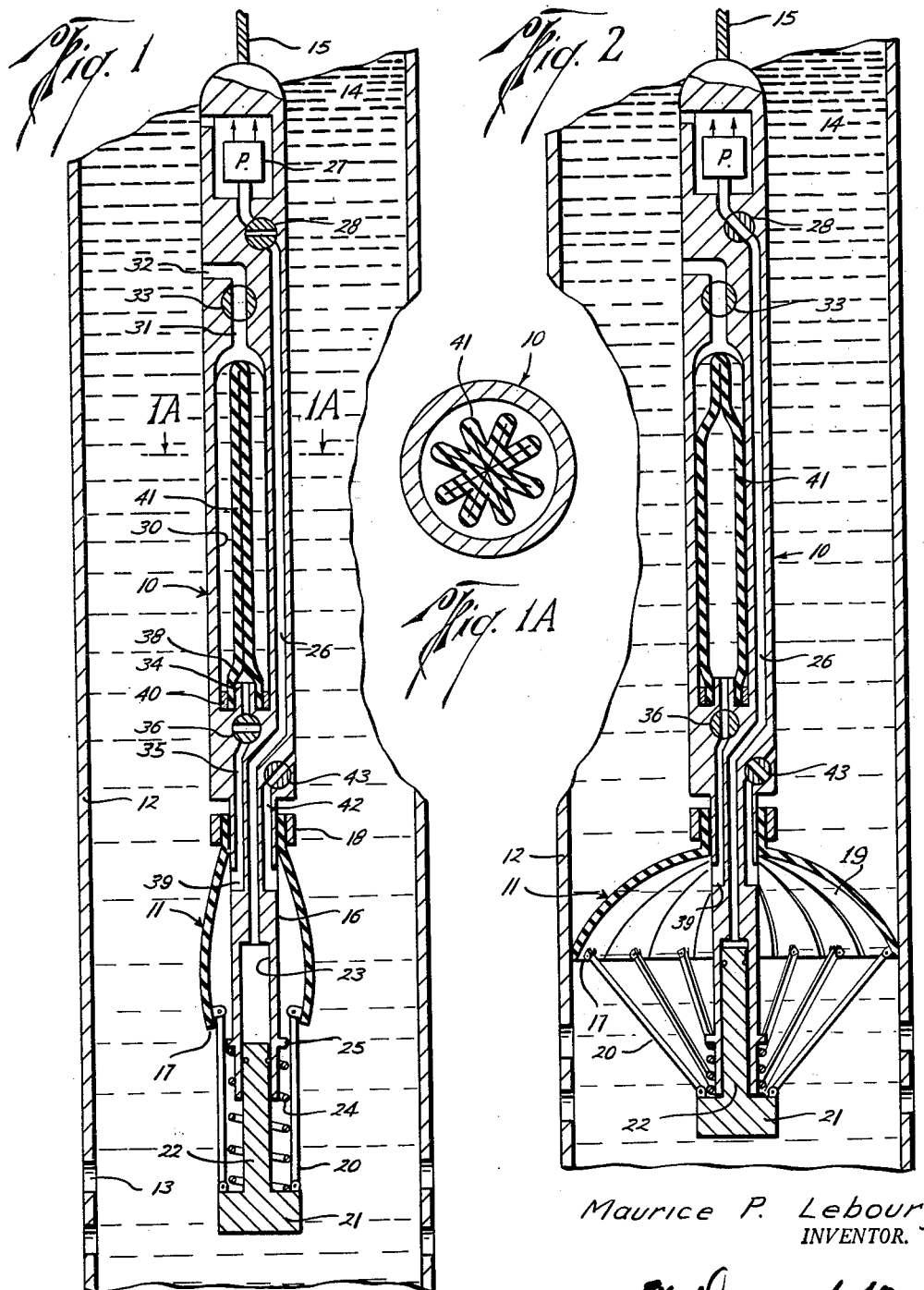

---

3,104,713
FLUID SAMPLING APPARATUS
Maurice P. Lebourg, Houston, Tex., assignor to Schlumberger Well Surveying Corporation, Houston, Tex., a corporation of Texas
Filed July 3, 1959, Ser. No. 824,835
10 Claims. (Cl. 166—142)

This invention relates to a production analyzing tool and, more particularly, to apparatus for obtaining a representative fluid sample of a fluid flowing in a well when taken at a given depth and at the same time giving the amount of fluid flowing at a given time.

In a production well, for example, a typical well producing oil having a low water content, it often has been found that a stationary water column may extend hundreds of feet from the bottom of the well or from the top of the producing zone so that the produced fluids are actually passing through the water column. Hence, when a conventional fluid sampler is operated in this column of water it will obtain a sample which contains both the static water and the flowing fluids. Obviously, such a sample is not representative of the flowing fluids and little information as to the composition of produced fluids at the depth that the sample is taken can be obtained. It is also desirable to know the rate of flow of the fluids at a given level.

Accordingly, it is an object of the present invention to provide new and improved systems for analyzing the rate of flow at a given level and the composition of the fluid flow.

It is another object of the present invention to provide new and improved sample-taking apparatus for obtaining a fluid sample at a given depth in a well bore which is representative of fluid flowing in the well at the given depth.

It is a further object of the present invention to provide new and improved sample-taking apparatus for obtaining a fluid sample at a given depth in a well bore which is representative of fluid flowing through a static column of fluid at the given depth.

These and other objects of the present invention are obtained by lowering a tool in a well to a level or depth at which a sample of a flowing fluid is desired. The tool is provided with channeling means for directing the flowing fluid into the tool while a collapsed flexible member for retaining a representative sample volume of fluid collects a fluid sample without offering any substantial resistance to the flow. After a timed interval sufficient to obtain a fluid sample in the flexible member, the flow into the flexible member is shut off thereby to trap the sample within the flexible member. Thereafter the tool is returned to the surface where the fluid sample may be analyzed.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

FIG. 1 illustrates apparatus embodying the present invention in one operative condition prior to obtaining a fluid sample.

FIG. 1A is a cross-sectional view of the sample-receiving means taken along a plane A—A in FIG. 1.

FIG. 2 illustrates apparatus embodying the present invention in another operative condition after a fluid sample has been obtained.

In FIG. 1, apparatus embodying the present invention includes a cylindrical sample taking housing 10 adapted for passage through a string of tubing (not shown) and packer device or channeling means 11 which may assume a retracted position for passage through tubing (FIG. 1) or an extended position to effectively extend across a horizontal cross section of casing 12 (FIG. 2). In the extended position of packer device 11, fluid flow from a location below the packer device is channeled into the housing.

Casing 12 of the well generally extends transversely through earth formations (not shown) and is suitably cemented in a borehole (not shown) in a customary manner. At a production level, the casing 12 has perforations 13 which permit hydrocarbons, etc., from the formations to flow into the casing, the hydrocarbons normally flowing upwardly through the tubing (not shown) in a customary manner to the earth's surface. A static column of fluid 14 is assumed to be present within the casing 12 and may consist mainly of water separated from the flow of fluid produced through the perforations 13.

Housing 10 is suspended in the casing 12 by means of a multi-conductor cable 15 and a winch (not shown) located at the earth's surface which serves to raise and lower the housing in a customary manner. A casing collar locator (not shown) may also be employed with the housing 10 to permit depth location of the housing in the well.

Housing 10 consists of an elongated cylindrical member with a lower cylindrical end portion 16 of reduced diameter. Packer device 11 is in the form of an "umbrella" or generally cone-shaped unit with a base or lowermost portion 17 adapted to extend across the cross-section of the casing, the base portion sloping inwardly and upwardly to an upper end portion whichh as an opening to receive the lower end portion 16. The upper end portion of the device 11 is suitably secured and sealed to the housing 10 by conventional clamping means 18. Packer device 11 consists of a plurality of overlapped "petal-like" plate members 19 (FIG. 2) which are arranged to fan about the clamped upper portions into an open position where the lower edge surfaces are substantially in engagement with the walls of the casing thereby substantially blocking fluid flow upwardly through the casing past or about the tool. A portion of the lower end of each of the plate members 19 is connected by a depending link member 20 to a cylindrically-shaped member 21 located below the lower extremity of end portion 16.

Member 21 has an upwardly extending portion of reduced diameter forming a piston 22 which is slidably received and sealed within a cylinder 23 in the lower end 16 of the housing 10. A spring 24 is connected in tension between the member 21 and a projection 25 on the lower end portion 16, the spring acting to urge member 21 upwardly towards the housing 10 thereby to fan the plate members 19 outwardly into engagement with the casing. Cylinder 23 is connected via a passageway 26 through the housing 10 to a conventional reversible fluid pump 27 in the upper portion of the housing. Pump 27 is connected by conductors (not shown) to surface controls (not shown) for actuation in a conventional manner. Thus, when the pump 27 is actuated in one direction, fluid from the well may be pumped into the cylinder 23 to move the piston 22 in a downward direction to retract the plate members 19. A solenoid valve 28 in passageway 26 permits the fluid to be entrapped within cylinder 23 to maintain the plate members 19 in a retracted condition. To extend the plate members 19, valve 28 is opened by surface controls (not shown) in a conventional manner, and the pump 27 is operated in a reverse manner to pump the fluid from cylinder 23, the spring 24 thereby assisting the extension of plate members 19. As will become apparent from the discussion to follow, the details of the packer device 11 do not comprise any part of the present invention, hence other suitable types of packer devices may be substituted for use with the present invention.

The housing 10 has an elongated cylindrical chamber 30 having an opening at its upper extremity which permits fluid communication through a passageway 31 to the exterior of the housing at a port 32. A conventional solenoid valve 33 is disposed in passageway 31 and is electrically operated from the surface of the earth in a customary manner to open or close the passageway 31. In the lower extremity of the chamber 30 is an upstanding tubular annular extension 34, the extension 34 opening through a passageway 35 to the exterior of the housing at a port 39 which is located below the under surface of the packer device 11. A conventional solenoid valve 36 is disposed in passageway 35 which is electrically operated from the surface of the earth in a customary manner to open or close the passageway 35.

An elongated flexible bag member 41 is collapsed and disposed in chamber 30, the open end 38 of the bag member 41 being received over extension 34 and suitably secured thereto by conventional clamp means 40. Bag member 41 may be constructed of any suitable material such as a treated fabric, for example, a fabric woven of Dacron fibers impregnated with a polymer of trifluorochloroethylene sold under the trademark "Kel-F" Latex by M. W. Kellogg Co. In general, the bag should have excellent chemical resistance to the corrosive effects of borehole fluid and be capable of retaining a fluid sample. As shown in FIG. 1A, bag member 41 may be longitudinally folded into a collapsed position so as to have almost zero volume in the interior of the bag. The bag member 41 in a fully extended position, is sized to conform with and be supported directly by the chamber walls.

Housing 10 is also provided with passageway 42 which extends between ports above and below the upper and lower surfaces of the packer device 11 so that fluid may be permitted to bypass the packer device 11. A solenoid valve 43 is provided in the passageway and is selectively operable in the customary manner to open and close the passageway 42.

In operation, the apparatus 10 is lowered through a string of tubing in a producing well with the packer device 11 collapsed as shown in FIG. 1. In this position, cylinder 23 contains fluid under pressure which holds the packer device in a collapsed position, bypass valve 43 is open to permit fluid to bypass the packer device 11. Sample-taking valve 36 is closed while control valve 33 is open. Thus, the interior of the bag member 41 is closed off from the well fluid while chamber 30 contains well fluid which surrounds the exterior of the bag member 41. Therefore, the well fluid in chamber 30 is at a pressure corresponding to the hydrostatic pressure of the fluid in the casing at the depth where the apparatus is located. Since the interior of the bag member is at a low pressure relative to the hydrostatic pressure, the well fluid maintains the interior of the bag member at a minimum volume. At the level where a fluid sample is desired, the pump valve 28 is opened and the pump 27 actuated to pump fluid from the cylinder 23 thereby permitting the piston 22 to move upwardly relative to the housing 10 under the action of spring 24 and the force of the well fluid. As the piston 22 moves upwardly relative to the housing, the plate members 19 of the packer device 11 are extended outwardly of the housing 10 by links 20 and fan out into contact with the walls of the casing 12 to present a substantially solid and fluid-impervious barrier across the casing (FIG. 2). Since bypass valve 43 is open there is no initial differential pressure across the packer device 11 and the composition and flow of the formation fluids flowing upwardly through the static column remain undisturbed and representative of their condition prior to placing the tool in the well.

The chamber 30, of course, remains filled with fluid which is at the same pressure as the hydrostatic pressure at the testing level. Thereafter, bypass valve 43 is closed and sample valve 36 is opened. The fluid flowing upwardly through the static column of fluid is therefore free to enter via port 39 and passageway 35 into the interior of bag member 41 (FIG. 2) and the dynamic pressure of the fluid causes the bag member 41 to move from a collapsed position to an extended position to displace the well fluid from chamber 30.

A suitable period of time is allowed to elapse to collect the fluid sample and then the control valve 33 and sample valve 36 are closed while the bypass valve 43 is opened. The period of time may be determined from the known production rate so that the valves 33 and 36 are actuated prior to the time that the bag member 41 is completely filled. Thus, a representative sample is enclosed within the bag member 41 within chamber 30 while the flowing fluid is again permitted to bypass the packer device 11 through passage 42. Thereafter the pump 27 is actuated to pump fluid into cylinder 23 and cause the plate members 19 to be retracted.

The apparatus may then be retrieved to the earth's surface to permit the composition of the fluid sample to be obtained. The fluid sample is removed from the bag member 41 by connecting a source of pressure to port 32, opening valves 33 and 36 and by applying pressure through port 32. Thus, the gas-oil-water ratio of the sample may be analyzed when the sample exits from port 39. Also, it will be appreciated that for a collected volume of flowing sample in a given period of time, the rate of flow of the flowing fluids may be determined.

While a particular embodiment of the present invention has been shown and described, it is apparent that changes and modifications may be made without departing from this invention in its broader aspects, and therefore the aim in the appended claims is to cover all such changes and modifications as fall within the true spirit and scope of this invention.

What is claimed is:

1. Apparatus for obtaining a fluid sample of a flowing fluid in a well comprising: a sample taker housing adapted to be passed through a well to a level where a fluid sample is desired; packer means secured to said housing; means on said housing for moving said packer means between extended and collapsed positions relative to said housing, said packer means in its extended position serving to impede the flow of fluid past said housing longitudinally of said well; said housing having a chamber, said chamber opening on one side of said packer means to the exterior of said housing to admit well fluid to said chamber; a normally-collapsed elongated flexible bag member retained in said chamber and having exterior portions exposed to said well fluid; and means in said housing coupled to said bag member for placing the interior of said bag member in fluid communication with the exterior of said housing on the other side of said packer device when said packer means is in an extended position, thereby to permit fluid flowing in the well to be selectively channeled into the interior portions of said bag member.

2. Apparatus for obtaining a fluid sample of a flowing fluid in a well comprising: a sample taker housing adapted to be passed through a well to a level where a fluid sample is desired; packer means secured to said housing; means on said housing for moving said packer means between extended and collapsed positions relative to said housing, said packer means in its extended position serving to impede the flow of fluid past said housing longitudinally of said well, said housing having a chamber, said chamber opening on one side of said packer means to the exterior of said housing to admit well fluid to said chamber; a normally-collapsed elongated flexible bag member in said chamber, said member having exterior portions exposed to said well fluid in said chamber and having portions defining an opening to its interior connected to said housing; and means in said housing including a passageway and valve means in said passageway coupled to said bag member for placing the interior of said bag member in fluid communication with the exterior of said housing on the other side of said packer means when said packer means is in an extended position, thereby to permit fluid flowing in the well to be channeled into the interior of said bag member.

3. Apparatus for use in a well comprising: a sample taker housing adapted for passage through a well to a level where a fluid sample is desired, said housing having an elongated chamber and a passageway to the exterior of said housing to admit well fluid to said chamber thereby balancing the static pressure of the fluid in the chamber to the pressure of the fluid externally of the chamber; means on said housing for substantially blocking the cross-sectional area of the well bore at a selected level in a well bore; a normally-collapsed elongated flexible bag member retained in said chamber and having exterior portions exposed to the well fluid below said passageway; and means in said housing coupled to said bag member for placing the interior of said bag member in fluid communication with the exterior of said housing so that flowing fluid may enter the interior of said bag member to extend the bag member under the force of the fluid flow; means in said housing for selectively closing said passageway and said last-mentioned means.

4. Apparatus for obtaining a fluid sample of a flowing fluid in a well comprising: a sample taker housing adapted to be passed through a well to a level where a fluid sample is desired; packer means secured to said housing; means on said housing for moving said packer means between extended and collapsed positions relative to said housing, said packer means in its extended position serving to impede the flow of fluid past said housing longitudinally of said well, said housing having a chamber and a passageway to place said chamber in fluid communication with the exterior of said housing on one side of said packer means to admit well fluid to said chamber; valve means in said passageway selectively operable to open and close said passageway; a normally-collapsed elongated flexible bag member retained in said chamber and having exterior portions exposed to said well fluid; and means in said housing coupled to said bag member for placing the interior of said bag member in fluid communication with the exterior of said housing on the other side of said packer means when said packer device is in an extended position thereby to permit fluid flowing in the well to be channeled into the interior of said bag member.

5. Apparatus for obtaining a fluid sample of a flowing fluid in a well comprising; a sample taker housing adapted to be passed through a well to a level where a fluid sample is desired; packer means secured to said housing; means on said housing for moving said packer means between extended and collapsed positions relative to said housing, said packer means in its extended position serving to impede the flow of fluid past said housing longitudinally of said well, said housing having a chamber and a passageway to place said chamber in fluid communication with the exterior of said housing on one side of said packer means to admit well fluid to said chamber; valve means in said passageway selectively operable to open and close said passageway; a normally-collapsed elongated flexible bag member in said chamber, said member having exterior portions exposed to said well fluid in said chamber and having portions defining an opening to its interior connected to said housing; and means in said housing including another passageway and a valve means in said other passageway coupled to said bag member for placing the interior of said bag member in fluid communication with the exterior of said housing on the other side of said packer means when said packer device is in an extended position thereby to permit fluid flowing in the well to be channeled into the interior of said bag member.

6. Apparatus for obtaining a fluid sample of a flowing fluid in a well comprising: a sample taker housing adapted to be passed through a well to a level where a fluid sample is desired; packer means secured to the lower end portion of said housing; means on said housing for moving said packer means between extended and collapsed positions relative to said housing, the extended position being sufficient to impede the flow of fluid past said housing; said housing having a chamber, said chamber opening on one side of said packer means to the exterior of said housing to admit well fluid to said chamber; a normally-collapsed elongated flexible bag member retained in said chamber and having exterior portions exposed to said well fluid and interior portions adapted to be placed in fluid communication with the exterior of said housing below said packer means; means in said housing coupled to said bag member to selectively place the interior portions of said bag member in fluid communication with the exterior of said housing below said packer means thereby to permit fluid flowing in the well to be selectively channeled into the interior portions of said bag member when said packer means is in an extended position; a bypass passageway in said housing opening above and below said packer means to the exterior of said housing; and valve means in said bypass passageway to selectively open and close said passageway.

7. Apparatus for obtaining a fluid sample of a flowing fluid in a well comprising: a sample taker housing adapted to be passed through a well to a level where a fluid sample is desired; packer means secured to the lower end portion of said housing; means on said housing for moving said packer means between extended and collapsed positions relative to said housing, the extended position being sufficient to block off the bore of the well; said housing having a chamber, said chamber opening above said packer means to the exterior of said housing to admit well fluid to said chamber; a normally-collapsed elongated flexible bag member in said chamber, said member having exterior portions exposed to said well fluid in said chamber and having portions defining an opening to its interior connected to said housing, and said bag member having folds extending in a longitudinal direction thereby affording a minimum volume defined by said interior portions; and means in said housing coupled to said bag member to selectively place the interior portions of said bag member in fluid communication with the exterior of said housing below said packer device thereby to permit fluid flowing in the well to be selectively channeled into the interior portions of said bag member when said packer device is in an extended position.

8. Apparatus for obtaining a fluid sample of a flowing fluid in a well comprising: a sample taker housing adapted to be passed through a well to a level where a fluid sample is desired: packer means secured to the lower end portion of said housing; means on said housing for moving said packer means between extended and collapsed positions relative to said housing, the extended position being sufficient to block off the bore of the well; said housing having a chamber and a passageway to place said chamber in fluid communication with the exterior of said housing above said packer device to admit well fluid to said chamber; valve means in said passageway selectively operable to open and close said passageway; a normally-collapsed elongated flexible bag member in said chamber, said member having exterior portions exposed to said well fluid in said chamber and having portions defining an opening to its interior connected to said housing, and said bag member having folds extending in a longitudinal direction thereby affording a minimum volume defined by said interior portions; means in said housing coupled to said bag member including another passageway and valve means in said other passageway to selectively place the interior portions of said bag member in fluid communication with the exterior fluid flowing in the well below said packer means thereby to permit said fluid to be channeled into the interior portions of said bag member when said packer means is in an extended position; a bypass passageway in said housing opening above and below said packer means to the exterior of said housing; and valve means in said bypass passageway to selectively open and close said passageway.

9. Apparatus for obtaining a representative fluid sample of a flowing fluid in a well comprising: a housing, a flexible, hollow, fluid-retaining member in said housing capable of movement between collapsed and extended positions, means in said housing for admitting well fluid to the exterior of said fluid-retaining member to apply a constraining differential pressure thereto while the interior of said fluid-retaining member is substantially at atmospheric pressure thereby maintaining said member in a collapsed position while being lowered into a well, means coupled to said housing for substantially blocking the cross-sectional area of the well bore at a selected level in the well, and means in said housing for selectively coupling the interior of said fluid-retaining member to fluid flow from below the area blocking means whereby the dynamic pressure of the fluid flow from the well below the blocked area may move said fluid retaining member from a collapsed position to an extended position.

10. Apparatus for obtaining a representative fluid sample of a flowing fluid in a well comprising: a housing, expansible fluid-retaining means in said housing, said fluid-retaining means being expansible from a collapsed condition to an expanded condition, means in said housing for applying a constraining force to said fluid-retaining means with a magnitude greater than the pressure of the fluid at the level of testing to maintain said fluid-retaining means in a normally collapsed condition, means coupled to said housing for substantially blocking the cross-sectional area of the well bore at a selected level in the well, means in said housing for operating said constraining means to release the constraining force on said fluid-retaining means, and means in said housing for coupling said fluid-retaining means to the fluid flow below the area blocking means to admit fluid to the interior of the fluid-retaining means whereby the dynamic pressure of the fluid flow may expand said fluid-retaining means from a collapsed condition to an expanded condition.

References Cited in the file of this patent

UNITED STATES PATENTS

| | | |
|---|---|---|
| 2,171,000 | Iden | Aug. 29, 1939 |
| 2,176,240 | Bandy | Oct. 17, 1939 |
| 2,623,594 | Sewell | Dec. 30, 1952 |
| 2,702,474 | Johnston | Feb. 22, 1955 |
| 2,927,641 | Buck | Mar. 8, 1960 |
| 3,022,826 | Kisling | Feb. 27, 1962 |

FOREIGN PATENTS

| | | |
|---|---|---|
| 322,910 | Switzerland | Aug. 31, 1957 |